United States Patent
Hund et al.

(10) Patent No.: US 10,091,016 B2
(45) Date of Patent: Oct. 2, 2018

(54) MIGRATION OF CONTROL ELEMENTS IN A BUILDING CONTROL SYSTEM

(71) Applicant: Deutsche Telekom AG, Bonn (DE)

(72) Inventors: Martin Hund, Rettert (DE); Thomas Unterschuetz, Weiterstadt (DE); Thorsten Sinning, Aachen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 299 days.

(21) Appl. No.: 14/953,034

(22) Filed: Nov. 27, 2015

(65) Prior Publication Data

US 2016/0154393 A1    Jun. 2, 2016

(30) Foreign Application Priority Data

Dec. 1, 2014  (DE) .......................... 10 2014 117 589

(51) Int. Cl.
*H04L 12/28* (2006.01)
*G05B 15/02* (2006.01)

(52) U.S. Cl.
CPC .......... *H04L 12/2816* (2013.01); *G05B 15/02* (2013.01); *H04L 12/2818* (2013.01); *H04L 12/2834* (2013.01); *H04L 12/2856* (2013.01)

(58) Field of Classification Search
None
See application file for complete search history.

(56) References Cited

U.S. PATENT DOCUMENTS

| | | |
|---|---|---|
| 2005/0044225 A1 | 2/2005 | Ota et al. |
| 2010/0332629 A1 | 12/2010 | Cotugno et al. |
| 2012/0089726 A1 | 4/2012 | Doddavula |
| 2017/0068230 A1* | 3/2017 | Hagins ................... G05B 15/02 |

* cited by examiner

*Primary Examiner* — Whitney T Moore
(74) *Attorney, Agent, or Firm* — Leydig, Voit & Mayer, Ltd.

(57) ABSTRACT

A method for controlling at least one device in at least one building includes: selectively transferring, by a control system comprising a server and a number of gateways, at least one application from the server to a particular gateway or from a particular gateway to the server based on at least one transfer rule; and controlling, by the control system, the at least one device via the at least one application.

14 Claims, 5 Drawing Sheets

MIGRATION OF CONTROL ELEMENTS IN A BUILDING CONTROL SYSTEM

CROSS-REFERENCE TO RELATED APPLICATIONS

Priority is claimed to German Patent Application No. DE 10 2014 117 589.1, filed on Dec. 1, 2014, the entire disclosure of which is hereby incorporated by reference herein.

FIELD

The present invention relates to a method for controlling at least one device in at least one building and to a control system.

BACKGROUND

For controlling, in particular remotely controlling, devices in buildings, such as lighting and/or security electronics, methods are traditionally used which are implemented or initiated on either a central server or a local gateway.

For control via a central server, particular applications used for controlling particular devices are managed and implemented centrally via a server. A central server as a management unit has advantages such as efficient management of particular software. This means that, for example when updates are run, only a central instance has to be overseen by a technician so as to control a plurality of devices in a plurality of buildings in accordance with the particular updates. In particular for users who manage a plurality of buildings, central servers may be a considerable simplification, since a complex local configuration of hardware is not required.

On the other hand, drawbacks in the operation of central servers are also known, such as connection losses, which lead to a loss of control over particular devices and may in some cases cause considerable damage.

Via a gateway which is arranged locally in a particular building to be managed, by contrast with a central server, control is possible directly, in other words in particular via physical lines, and with correspondingly short latency. A local gateway makes it possible to control particular devices even if a communication connection is interrupted externally, for example if an Internet connection is interrupted. However, gateways can only be coordinated with one another with difficulty, and require regular maintenance. If gateways are not maintained regularly, i.e. provided with up-to-date software for example, security flaws may occur, in particular during operation of security systems.

SUMMARY

In an embodiment, the invention provides a method for controlling at least one device in at least one building, the method comprising: selectively transferring, by a control system comprising a server and a number of gateways, at least one application from the server to a particular gateway of the gateways or from the particular gateway to the server based on at least one transfer rule; and controlling, by the control system, the at least one device via the at least one application.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the invention provides a method for controlling at least one device in at least one building, in which the at least one device is controlled via at least one application comprised by a control system, the control system comprising a server and a number of gateways, and the at least one application being selectively transferred from the server to a particular gateway in accordance with at least one transfer rule to be provided in advance and being used on the particular gateway for directly controlling the at least one device, or conversely being transferred from a particular gateway to the server and being used on the server for indirectly controlling the at least one device.

The method may be used in particular for controlling and managing devices in buildings.

In the context of the present disclosure, a device may be any object in a building which is to be controlled or changed in terms of its properties, by way of electrical signals.

In the context of the present disclosure, an application implements particular functionality of at least one device. Applications may also control a plurality of devices, such as heating systems, alarm systems, blinds or lights. In particular it is provided that particular applications control particular devices via sensors and/or actuators which ultimately implement a particular home automation command.

In the context of the disclosure, a management rule (appliance rule) makes it possible for a management instance to coordinate for example competing requests from different applications. For this purpose, a management rule may comprise in particular a prioritisation rule. This means that, for example a management rule "all lights in the house should be switched on in the event of a break-in", is implemented at a higher priority than a management rule "all lights should be switched off at night".

In the context of the disclosure, a transfer rule (migration rule) decides whether an application remains in or is transferred from a particular source system. A transfer rule may in particular be predetermined by a user or by an application to be transferred itself. A transfer rule may be specified or predetermined by various agents, such as a manufacturer of a particular application who predetermines a general transfer rule. Further, transfer rules may be specified by a user himself and adapted to his needs. A service consultant may also predetermine appropriate transfer rules in order to implement requirements of the user. It is also possible for transfer rules to be specified by a transfer rule management unit (migration rule engine), the central server or any other technical element of a device to be controlled. For example, for an application for switching a lighting system for a large store, it may be advantageous for said application be implemented directly on a local gateway so as to rapidly implement individual switch-on times, in other words with low latency, whereas an application for controlling a lighting system of a housing block is better implemented centrally on a server so as to coordinate various accommodation units of the housing block.

In an embodiment, it is possible to manage applications for controlling a particular device centrally and if required to implement them locally. For this purpose, it is provided that a multi-stage building automation system comprising a central server and at least one local gateway is used in a particular building. By using the central server to manage particular software, i.e. for example applications, it is possible to run updates or other management data centrally and to transfer them to the at least one gateway, generally to particular gateways, in such a way that local maintenance of particular gateways is not required. Further, using local gateways makes it possible to control particular devices largely independently of a communication connection to the central server, by implementing particular applications locally. This means that an application can always be implemented at the best-suited location for implementing the application, in other words on the central server or a local gateway, for example depending on a functionality of the application.

To make it possible, even in the event of a communication failure, in order to control particular devices in a building affected by the communication failure it is provided that particular applications are transferred to a particular gateway, on the basis of a transfer rule to be provided in advance, where they are implemented locally as required, in other words on the basis of the transfer rule and taking account of a corresponding management rule. It is provided that a particular application is carried out here or transferred to the management instance best suited for a functionality of the particular application, in other words that which best supports the functionality of the particular application, for example by locating it in a building.

As long as there is a communication connection between the server and a particular gateway, the invention provides that particular applications for controlling particular devices are transferred to the particular gateway and carried out there as required. This means that management actions, such as maintenance actions for running an update, which affect a plurality of gateways can be implemented centrally on the server in such a way that local maintenance is not required.

As described above, in an embodiment, two paths are provided for implementing an application for controlling a particular device. The first path goes via the central server, which implements particular applications and communicates with particular gateways and accordingly with particular devices via a communication line, such as the Internet or a wireless network. The second path goes via a particular local gateway, which has received the particular application or applications from the central server and implements the particular application or applications locally and independently of the central server, and accordingly controls particular devices independently of the server.

In an embodiment, it is possible to carry out maintenance, such as a software update, rapidly and efficiently for a plurality of gateways and optionally to transfer adjustments made on a particular gateway to further gateways and implement them on said gateways in accordance with the desired functionality.

In particular, an embodiment provides that a particular application is available both on the central server and on a particular gateway and is implemented on the server or the gateway on the basis of a particular management rule which is for example predetermined by the particular application and registered in a particular management rule management instance. This means that the particular application can be present in a twofold implementation, in other words it can be present on the server and preinstalled on the gateway in such a way that complex data transfer, for example of software artefacts of the particular application, can be avoided when the particular application is transferred to the server or the gateway. In the case of a preinstalled application, the particular application is transferred rapidly and simply by transferring a control command for activation and optionally management rules specified on a source system.

In an embodiment, the central server is a cloud server which is implemented virtually in a memory of a physical server.

For managing a particular application, it is provided that the application can migrate between the server and particular gateways, in other words that the application can be transferred, in particular completely, from the server to a particular gateway or from the particular gateway to the server. By migrating, in other words transferring, a particular application, it is possible to transfer a control of a particular device between the server and the gateway and to implement it centrally or locally as required.

In an embodiment, it is possible to manage a plurality of buildings centrally, to control corresponding devices in a mutually calibrated manner, and to maintain functionality of the control system, by locally implementing a corresponding application on particular gateways, if individual components of a corresponding control system fail.

In an embodiment, it is possible to transfer local settings, i.e. for example settings of a device or application on a gateway which are undertaken by a user, to the server and/or additional gateways of additional houses for example.

A further embodiment provides that the at least one application is transferred from the server to a particular gateway, on the basis of the transfer rule to be provided in advance, where it is used to directly, i.e. for example wirelessly, control the at least one device.

To make it possible to transfer a particular application between the server and particular gateways, it is provided that a transfer method comprising in particular four transfer steps is implemented. Initialisation is carried out in a first transfer step and has to be carried out at least once so as to carry out further transfer steps, any desired time span being possible between the initialisation and a further transfer step.

For initialisation, all programs or program components which might be relevant for the particular application are implemented on a source system, such as the server or a particular gateway, in other words set in operation. In this context, particular management rules of the particular application are registered in a management rule instance (appliance rule engine) of the source system. Further, artefacts of the particular application, such as different software versions, are stored in a memory (software repository) of the source system.

For initialisation, it is further required that particular gateways or servers be registered in a topology management instance (topology manager) of the source system as particular potential target systems for a transfer of the particular application. In a further embodiment, the topology management instance itself names potential alternative target systems to which the application might also need to be transferred, for example on the basis of prior knowledge.

In a further embodiment, the topology management instance to manage the particular application. The management comprises in particular registering the particular application in the topology management instance, it also being possible for the particular application to be registered in a further management instance, such as a transfer management instance (migration manager). Registering the particular application in a particular instance comprises in particular inputting particular rules, in other words transfer rules in the case of a transfer rule management instance (migration rule engine) or management rules in the case of a management rule management instance (appliance rule engine) of the source system.

In a further embodiment, the transfer management instance (migration manager) of the source system informs itself proactively about available target systems in the topology management instance and protocols them so as to extend the transfer of the particular application for example to further target systems.

In a second transfer step, it is provided that the transfer rule management instance of the source system establishes a need to transfer the particular application or part of the particular application on the basis of transfer rules, which are stored in a memory of the source system and registered during the initialisation step. Criteria for introducing a transfer may for example be a latency of a connection being exceeded, users moving, a transferred data amount being exceeded or undershot, a change in criticality of a functionality of a system stability and any further criterion relating to the operation of a building automation system.

If the transfer rule management instance of the source system establishes a need to transfer the particular application, it is provided that the transfer rule management instance of the source system informs the transfer management instance of the source system, which ultimately makes the decision regarding the transfer.

In a third transfer step, it is provided that the transfer management instance of the source system contacts the transfer management instance of the target system and transfers, to the transfer management instance of the target system, all information required for transferring the particular application, i.e. for example a software artefact of the particular application and additional information which may be required. Information of this type regarding the transfer of the particular application generally comprises at least one target address and a software artefact to be transferred and optionally configuration information. In a further embodiment, the information required for the transfer comprises information regarding tasks, yet to be processed, from a particular source system.

During the transfer of information to the transfer management instance of the target system, the transfer management instance of the target system may optionally identify particular artefacts to be transferred, such as software versions. Corresponding information or data are loaded into a memory of the target system.

Once all of the data have been loaded into the memory of the target system, the transfer management instance of the target system starts the transferred application. In a further embodiment, a current state of the application on the source system is queried when the application is started on the target system, so as to prevent target conflicts as a result of any tasks of the application on the source system which are yet to be processed.

It is further provided that the transferred application is registered in the transfer management instance of the target system for a further transfer which may subsequently be provided, the transfer management instance of the target system querying further target systems in the topology management instance. Further, the application registers the management rules thereof in the management rule management instance of the target system, which acts as a new source system in the case of a further transfer.

The topology management instance may be implemented centrally for example on a server, or locally at any desired location in a particular building automation system.

In a further embodiment, the management rules of a particular application specify when and whether synchronisation with a central server is carried out such that the application is always kept in an up-to-date software state.

In a fourth transfer step, control of particular devices is optionally handed over from the transfer management instance of the source system to the transfer management instance of the target system and extended to the application already started on the target system. Subsequently, the application on the source system is instructed to adjust or terminate its work, it being possible for the application to process final tasks and to subsequently be terminated. After the application on the source system is terminated, the management rules of the application are deregistered in the management rule management instance of the source system, i.e. for example deleted by the management rule instance of the source system, terminating the transfer process.

One embodiment provides that underlying migration technology is based on an OSGi-based software platform.

In a further embodiment, the memory of the source system is located outside the source system in any desired location in a corresponding building automation system, it also being possible for the memory to be organised in a central or distributed manner.

A further embodiment provides that the information is transferred, independently of an actual transfer process of a particular application, from the memory of the source system to the memory of the target system in the context of a preinstallation.

A further embodiment provides that the at least one application is transferred to the at least one gateway and/or the application is used to control the at least one device dynamically on the basis of the at least one transfer rule.

Since transfer rules can change, it is provided that a transfer method for transferring a particular application is carried out dynamically on the basis of current transfer rules.

In the context of the invention, a dynamic transfer should be taken to mean automatic, spontaneous transfer of data or software artefacts of a particular application, which transfer is carried out at a runtime of a corresponding system. This means that a dynamic transfer runs without human intervention, and it only remains to start a transferred application in a location favourable to a functionality of the application, without preinstallation being required. Alternatively, however, preinstallation involving activation, potentially to be undertaken on the basis of a transfer rule, is also possible.

One embodiment provides that the at least one application comprises a configuration, predetermined by a user, for controlling the at least one device.

The method makes it possible not only to ensure the functionality of a building automation system, in other words a control system, but also to transfer individual configurations, for example undertaken by a user for a particular building, to further buildings or the gateways thereof and thus to use them as a standard, it also being possible for the standard to be coupled to a presence or a state of the user, such as a body temperature, determined by biometric measurements using a temperature sensor.

In the context of the present invention, a building automation system should be taken to mean a control system for controlling devices, such as sensors or actuators, in buildings, in particular including biometric sensors for taking measurements on users within a building, such as are conventional for example in the field of electronic health monitoring.

A further embodiment provides that, when a particular application is updated on the server, the server automatically transfers, in other words copies, an updated version of the particular application to all gateways to which the particular application was previously transferred.

A further embodiment provides that the server is implemented on a portable CPU of a user.

To distribute an update to different gateways efficiently, it is provided that a correspondingly updated software version, as a software artefact of a particular application, is transferred from the central server to all relevant gateways in the context of a preinstallation, in other words prior to activation of the particular application on a particular gateway.

One embodiment provides that a management rule management instance coordinates requirements of different applications on a server or a gateway in accordance with a management rule predetermined by a particular application.

To manage and accordingly coordinate operation of different applications on different gateways, it is provided that an application to be transferred itself defines or comprises particular management rules and reports them back to a management rule management instance of a particular target system such that the management rules can be analysed and interpreted by the management rule management instance. By way of the management rules, for example prioritisation of a particular application with respect to further applications can be regulated.

The present invention further relates to a control system comprising a server and a number of gateways for controlling at least one device in at least one building, the control system being configured to control the at least one device via at least one application comprised by the control system, and the control system further being configured to selectively transfer the at least one application from the server to a particular gateway on the basis of at least one transfer rule to be provided in advance, and to use the at least one application from the particular gateway for directly controlling the at least one device, or conversely to transfer the at least one application from a particular gateway to the server and to use it on the server for indirectly controlling the at least one device.

The control system serves in particular to implement the method.

A transfer rule specifies a location best suited for a functionality of a particular application in a particular situation, in other words whether it is better to implement the particular application locally on a particular gateway or centrally on the server in a particular situation. In this way, a transfer rule may for example be implemented centrally on the server during sufficient lighting of a building by sunlight, so as to manage a supply of electrical energy, generated by solar collectors, to an electricity network. During darkness, however, it may be beneficial, for a functionality for maintaining the solar collectors, for the application to be implemented locally on a corresponding gateway.

One embodiment of the control system provides that the control system on the server and on a particular gateway in each case comprises at least one management instance for managing processes required for transferring the at least one application from the server to the particular gateway or transferring it from the particular gateway to the server, and in each case comprises a transfer rule instance which is configured to monitor particular parameters comprised by particular management rules on the server and/or the particular gateway and optionally to make a decision regarding transferring the at least one application to a further gateway in accordance with the at least one transfer rule and/or to activate the at least one application on the particular gateway, and the control system further comprising on the server and on the particular gateway a topology management instance in each case, which knows all potential target systems for transferring the at least one application.

Further advantages and embodiments of the invention can be found in the description and the accompanying drawings.

It will be appreciated that the aforementioned features and those yet to be described in the following can be used not only in the combination stated in each case, but also in other combinations or in isolation, without departing from the scope of the present invention.

The invention is shown schematically in the drawings by way of an embodiment, and is described in detail in the following with reference to the drawings.

Figure 1:
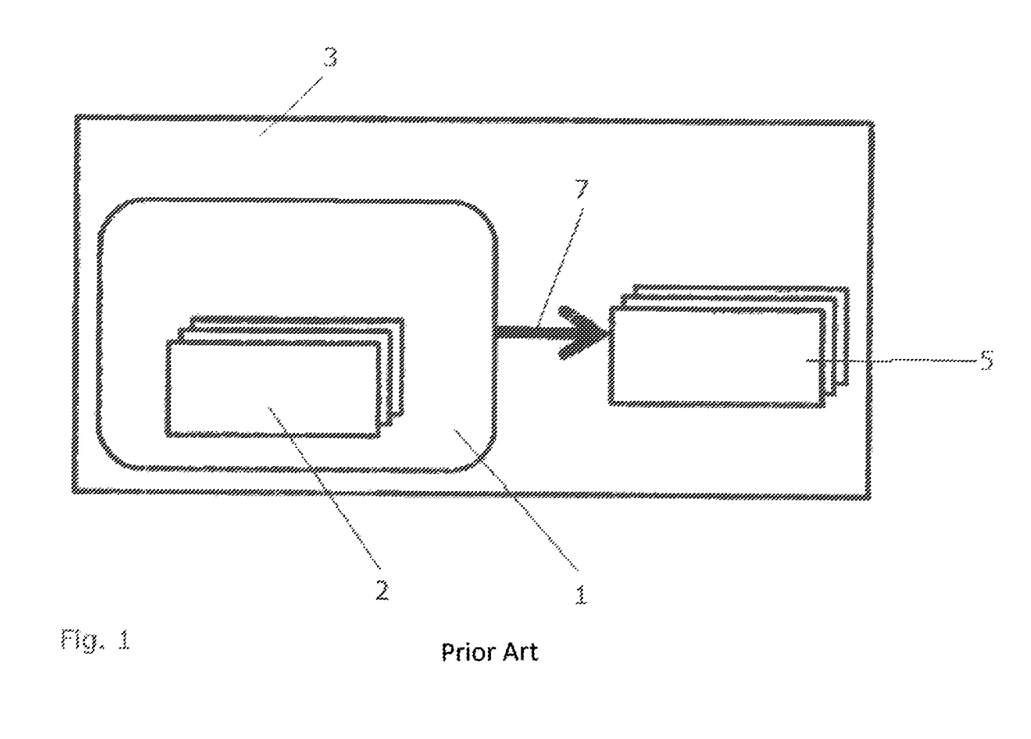
FIG. 1 is a schematic view of a prior art home automation system based on a gateway.

FIG. 1 shows a home automation gateway 1, such as is known in the art, which controls devices 5 comprised locally by a house 3. For this purpose, the home automation gateway 1 is connected to the devices 5 via a cable or a wireless interface, and via the cable or wireless interface transmits particular control commands generated by applications 2, as indicated by the arrow 7. As a result of the transmission via cables, the particular control commands are transferred to the devices 5 very rapidly, in other words with a low latency, in such a way that the devices 5 change the properties thereof correspondingly rapidly on the basis of the control commands.

Figure 2:
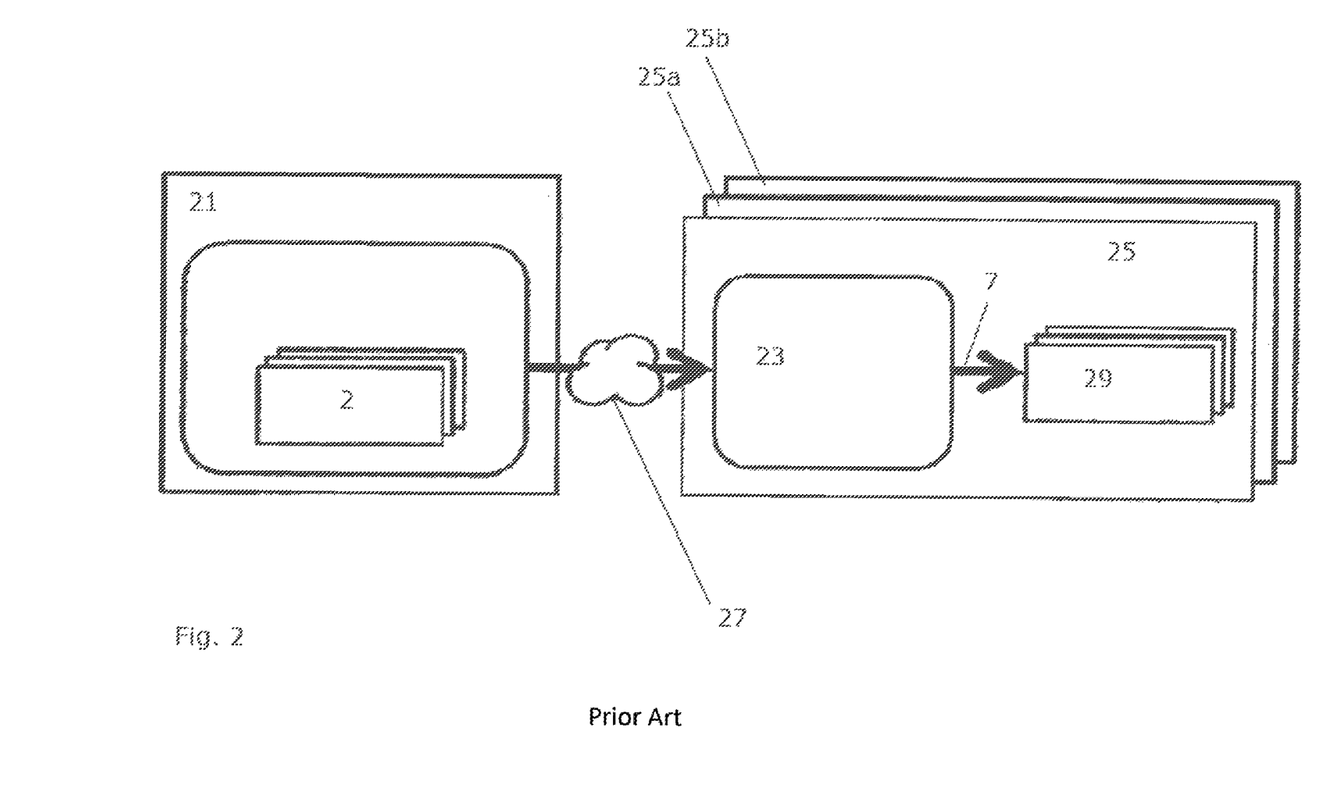
FIG. 2 is a schematic view of a prior art home automation system based on a central server.

FIG. 2 shows a central server 21 which is implemented by a physical server or as a virtual server.

The server 21 is in contact with a home automation bridge 23 in a house 25 by way of a communication connection via a cable or a wireless interface, for example via the Internet, as indicated by the arrow 27. The home automation bridge 23 converts signals received from the server 21 into control commands and transmits them to devices 29. If the communication connection, indicated by the arrow 27, is disrupted, the server 21 can no longer transmit signals to the home automation bridge 23, and so the server 21 no longer has any control over the devices 29.

The server 21 may control any desired number of further houses 25a, 25b via the communication connection, indicated by the arrow 27, and can regulate corresponding home automation bridges 23 or devices 29.

Figure 3:
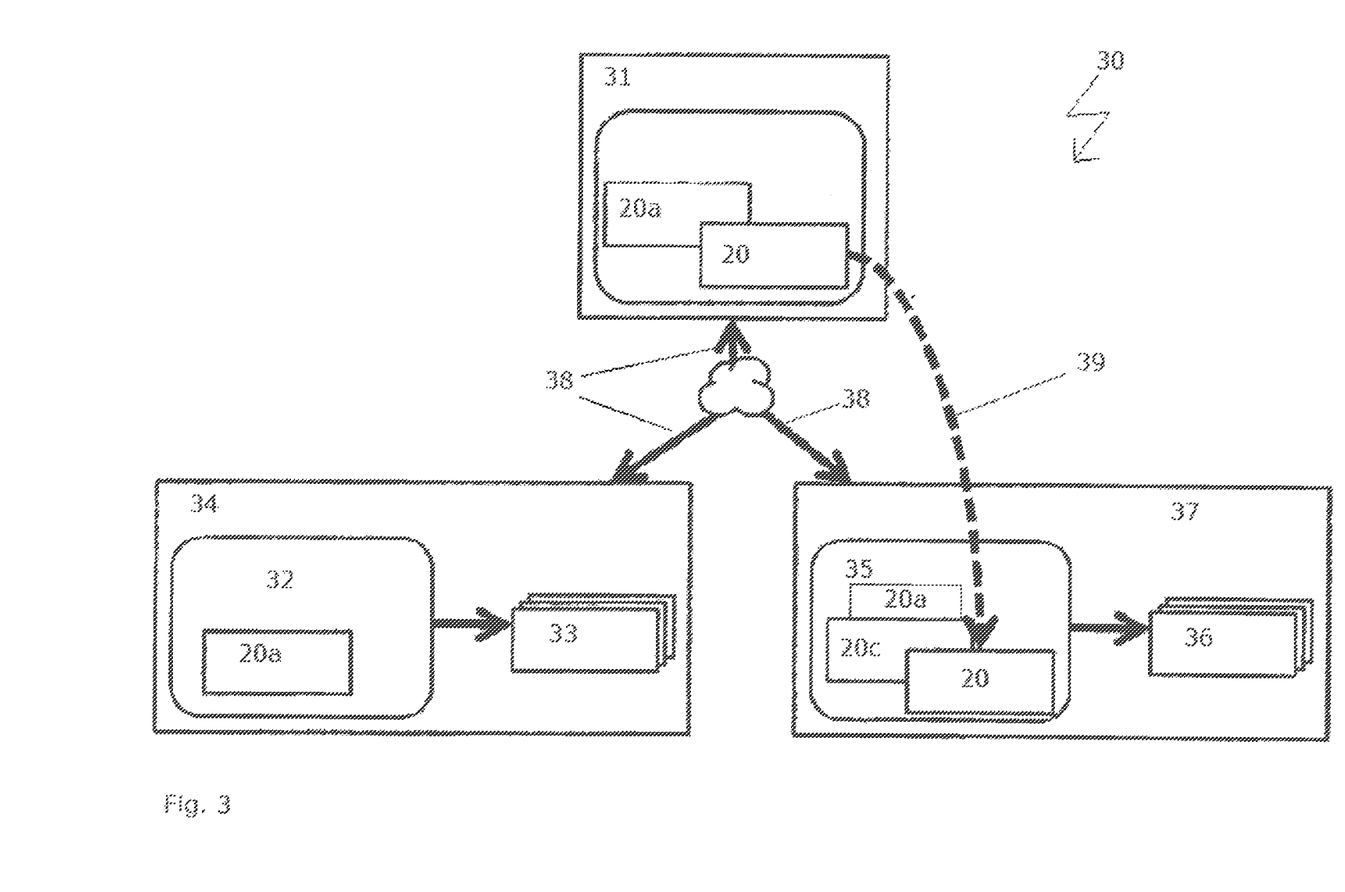
FIG. 3 is a schematic view of a control system in an exemplary embodiment.

FIG. 3 shows a control system 30 as it may be configured in accordance with the present invention. The control system comprises a server 31, a first gateway 32 for controlling devices 33 in a first house 34, and a second gateway 35 for controlling devices 36 in a second house 37.

To control the devices 33 and 36, which are configured for example as heating systems, the server 31 may transfer applications 20a and 20c to the gateways 32 and 35 via the Internet, as indicated by arrows 38. Selectively, in other words on the basis of requirements of a particular functionality of the applications 20a and 20c, the applications 20a and 20c are transferred to a particular gateway 32 or 35 where they are implemented, and therefore the applications 20a and 20c generate corresponding control signals for controlling the devices 33 and 36. This means that the devices 33 and 36 are controlled for example centrally by the server 31 as long as there is an Internet connection or as long as this is required for the functionality of the applications 20a and 20c. If there is a change in the functionality of the overall system, such as a bandwidth change in the Internet connection, it is beneficial for the functionality of the applications 20a and 20c for said applications to be implemented locally. Accordingly, an event of this type leads, preferably automatically, to a transfer of the applications 20a and 20c to the gateways 32 and 35 and to the activation thereof.

The transfer, indicated by the arrow 39, may for example take place on the basis of a transfer rule, for example on the basis of a connection quality or as a pre-installation, in other words independently of a current situation of the server 31 or gateway 35. Once the application 20 has been transferred to the gateway 35, it can be implemented on the gateway 35. It is provided that the application 20 is implemented on the gateway 35 on the basis of at least one management rule, which is in particular defined by the application 20 itself. This means that for example it can be defined by the application 20 in a management rule that in the event of a potential break-in into a building, the application 20 is transferred to the gateway 35 comprised by the building in accordance with a transfer rule, is implemented there and is used for controlling the devices 36, for example in the form of an alarm siren. This means that the application 20 is implemented at the location which is best suited to the functionality of the application 20. Since an intruder may interrupt a communication connection to the outside world, it is advantageous to implement the application on the local gateway 35. Further, management rules may also regulate functionalities of the application 20 independently of a transfer, in other words independently of a migration process.

In a further embodiment, the application 20a is transferred from the gateway 35 to the server 31 and/or the gateway 32, whilst maintaining adjustments made in the second house 37, such that the server 31 or the gateway 32 of the first house 34 controls the device 33, or the gateway 35 of the second house 37 controls the device 36 via the application 20a. The application 20a may for example act on a current room temperature via the device 33 or 36, respectively, on the basis of biosignals of a user.

Figure 4:
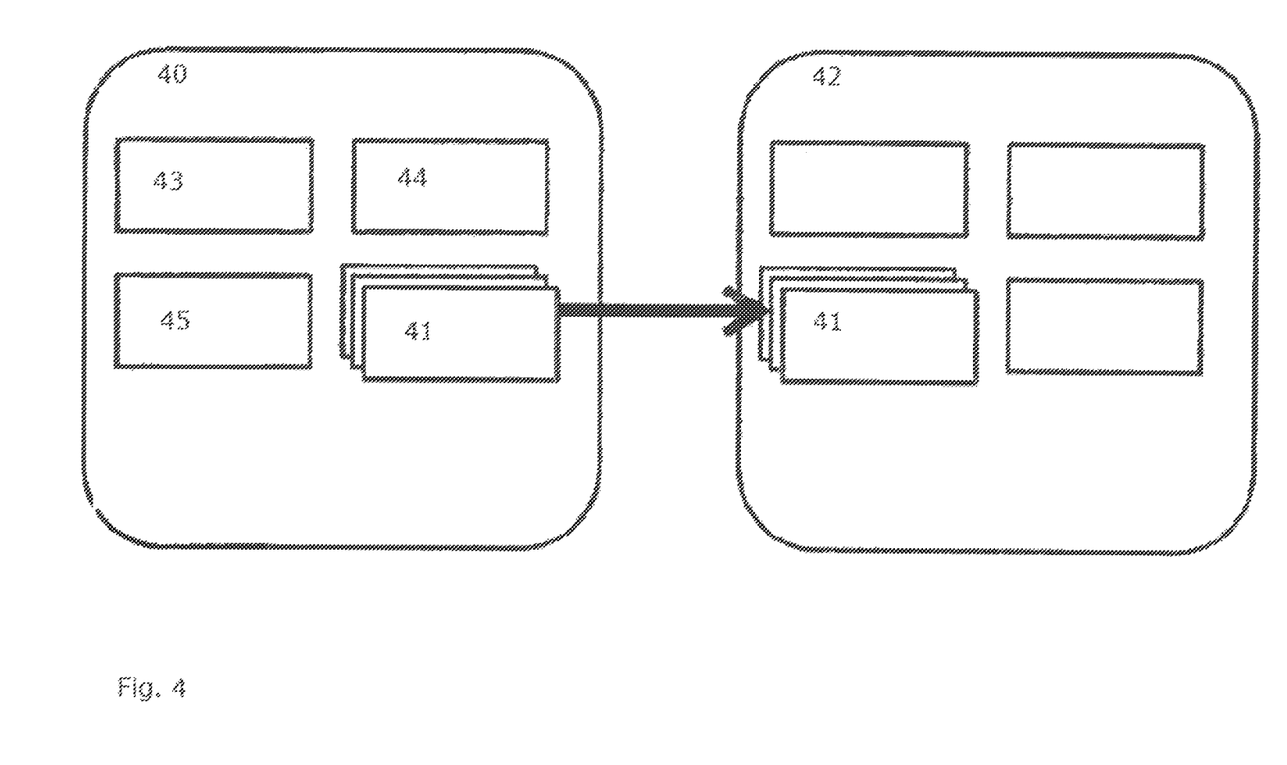
FIG. 4 is a schematic view of a transfer of applications in an exemplary embodiment.

FIG. 4 shows a sequence of a transfer process of an application 41 between a source system 40 and a target system 42.

During a transfer of the application 41, the application 41 migrates from the source system 40 to the target system 42. The migration process is managed by various components of the source system 40 and the target system 42.

A superordinate transfer management instance (migration manager) 43 of the source system 40 orchestrates all of the method steps surrounding the transfer of the application 41. In this context, the transfer management instance 43 is informed by a transfer rule management instance (migration rule engine) 44 as to any occurring need, specified in a transfer rule, regarding the transfer in accordance with the transfer rule predetermined for example by a user. By way of a query to a topology management instance (topology manager) 45, which knows all potential target systems for the application 41, the transfer management instance 43 defines the target system 42 and carries out the transfer of the application 41, in other words a corresponding data transfer.

Figure 5:
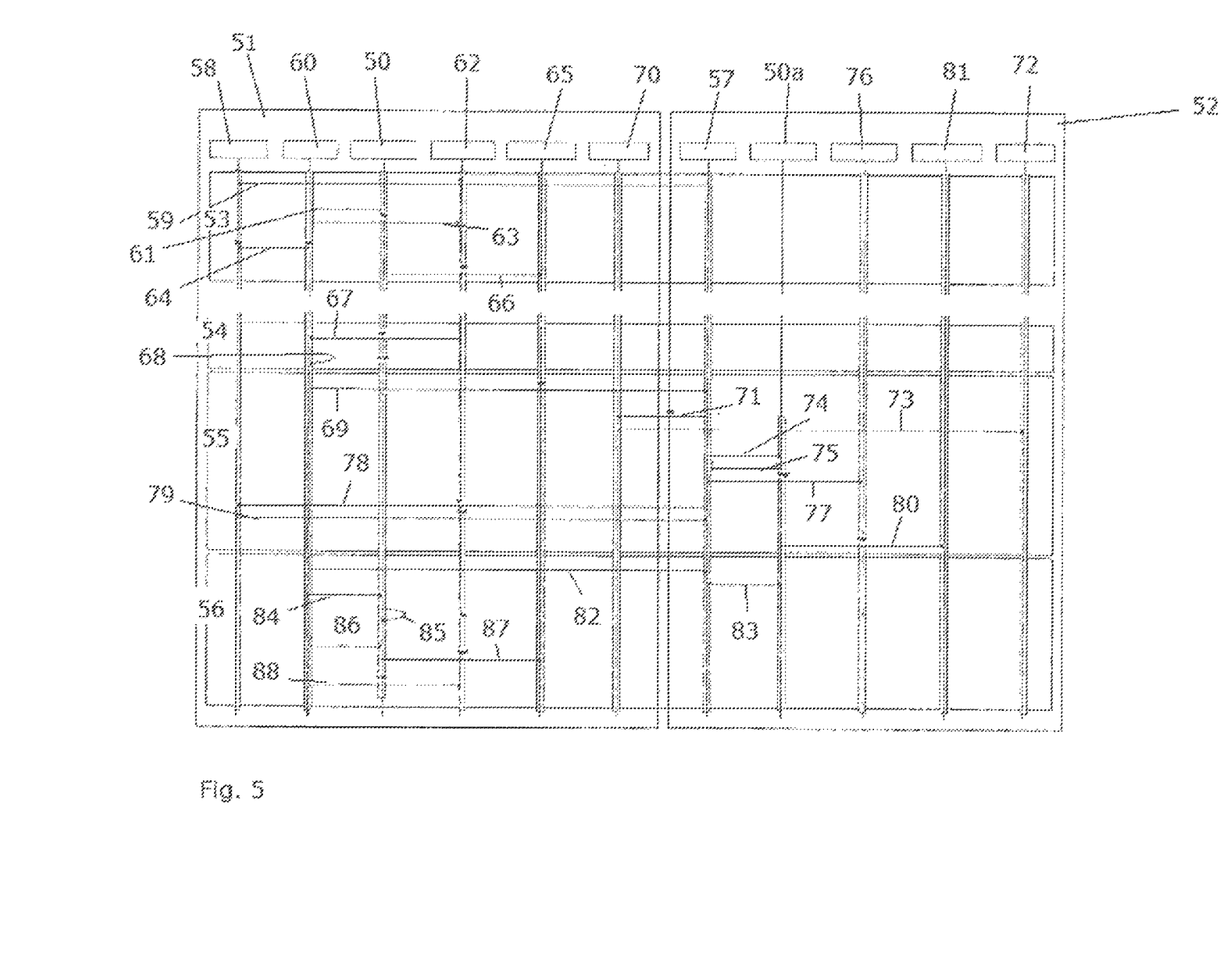
FIG. 5 is an overview of different method steps for transferring an application in an exemplary embodiment.

FIG. 5 shows a method for transferring an application 50 from a source system 51, such as a management server, to a target system 52, such as a building monitoring system. In a first method step 53, which may take place temporally and independently of further method steps 54, 55 and 56, a transfer management instance 57 of the target system 52 is initially registered in a topology management instance 58, as is indicated by the arrow 59. The topology management instance 58 may for example be implemented on the source system 51 or on any further CPU which is connected to the target system 52 and the source system 51.

The application 50 to be transferred is registered in a transfer management instance 60 of the source system 51, as is indicated by the arrow 61, whereupon the transfer management instance 60 transfers transfer rules, appropriate to the application 50 and predetermined by a user, to a transfer rule management instance 62, as is illustrated by the arrow 63.

Further, during the first method step 53, the target system 52 is identified by the transfer management instance 60 in the topology management instance 58, as is illustrated by the arrow 64. Further, management rules for managing and controlling the application 50 are transmitted to a management rule management instance 65, as is shown by the arrow 66.

In the second method step 54, by way of transfer rules, the transfer rule management instance 62 establishes a need to transfer, for example using a sensor system, and transmits a corresponding communication to the transfer management instance 60, as is shown by the arrow 67. By way of the information contained in the communication and optionally further information comprised by the transfer management instance 60, the transfer management instance 60 reaches a decision regarding the transfer of the application 50, as is illustrated by the arrow 68. The decision regarding the transfer of the application 50 may in particular be made during a runtime of the application 50 on the source system 51.

In the third method step 55, the transfer management instance 60 of the source system 51 contacts the transfer management instance 57 of the target system 52, as is shown by the arrow 69, whereupon the transfer management instance 57 queries software artefacts of the application 50 from a memory 70 of the source system 51, as is illustrated by the arrow 71. Simultaneously, data of the application 50, in other words software artefacts of the application 50, are loaded into a memory 72 of the target system 52, as is indicated by the arrow 73. The data may be transferred for example via a modem connected to the Internet or via any further technically suitable data interface.

Further, in accordance with the arrow 74, a start-up command for starting the application 50 or an application 50a on the target system 52 is issued by the transfer management instance 57. Once the application 50a has been started on the target system 42, the application 50a is registered in the transfer management instance 57, as is shown by the arrow 75, whereupon the transfer management instance 57 transmits corresponding transfer rules to a transfer rule management instance 76 of the target system 52 in accordance with the arrow 77. For a potential further transfer of the application 50a, the transfer management instance 57 communicates with the topology management instance 58 so as to identify further target systems for the application 50a, as is shown by the arrows 78 and 79. The registration of management rules, predetermined by the application 50, of the application 50a in a management rule management instance (appliance rule engine) 81 of the target system 52, as is indicated by the arrow 80, terminates the third method step 55.

In the fourth method step 56, rights or data for controlling the application 50 are transferred from the transfer management instance 60 of the source system 51 to the transfer management instance 57 of the target system 52, as is illustrated by the arrow 82, and control of the application 50 is activated, as is illustrated by the arrow 83.

Since control of the application 50 has been transferred to the transfer management instance 57, control of the application 50 on the source system 51 is terminated, as is shown by the arrow 84, any tasks which are still present optionally still being processed, as is indicated by the arrow 85, before the application 50 is finally deactivated in accordance with the arrow 86 by the transfer management instance 60 on the source system 51. Finally, the application 50 is deregistered in the management rule management instance 65 of the source system 51 and deregisters the transfer rules thereof in the transfer rule management instance 62 of the source system 51, as is indicated by the arrows 87 and 88.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling at least one device in at least one building, the method comprising:
   selectively transferring, by a control system comprising a server and a gateway, via a control command, at least one application from being activated at the server to being activated at the gateway or from being activated at the gateway to being activated at the server based on at least one transfer rule, wherein the at least one application is preinstalled both on the server and on the gateway; and
   controlling, by the control system, the at least one device via the at least one application.

2. The method according to claim 1, wherein the at least one application controls the at least one device dynamically based on a management rule of the at least one application.

3. The method according to claim 2, wherein the at least one management rule provides that, to maintain functionality of the control system, the at least one application is transferred to being activated at the gateway based on a failure of individual components of the control system.

4. The method according to claim 1, wherein the at least one application comprises a configuration, predetermined by a user, for controlling the at least one device.

5. The method according to claim 1, wherein the at least one transfer rule provides that the at least one application is transferred to being activated at the gateway based on a current position of a user.

6. The method according to claim 1, wherein, when the at least one application is updated on the server, the server automatically transfers an updated version of the at least one application to the gateway.

7. The method according to claim 1, wherein a management rule instance on the server and/or the gateway monitors particular parameters comprised by particular management rules.

8. The method according to claim 7, wherein the management rule instance makes a decision regarding transferring the at least one application to being activated at the gateway.

9. The method according to claim 1, wherein a transfer management instance coordinates requirements of different applications on the server or the gateway in accordance with a particular management rule predetermined by a particular application.

10. The method according to claim 9, wherein the requirements of the different applications are coordinated by way of a prioritization rule.

11. The method according to claim 1, wherein a target system suitable for transfer of the at least one application is selected by a management instance based on information provided by a topology program.

12. A control system for controlling at least one device in at least one building, comprising:
   a server; and
   a gateway;
   wherein the server or the gateway is configured to control the at least one device via at least one application, wherein the at least one application is preinstalled both on the server and on the gateway; and
   wherein the server and the gateway are configured to selectively transfer the at least one application from being activated at the server to being activated at the gateway or from being activated at the gateway to being activated at the server based on at least one transfer rule.

13. The control system according to claim 12, wherein the control system further comprises:
   at least one management instance for managing processes for transferring the at least one application from being activated at the server to being activated at the gateway or from being activated at the gateway to being activated at the server;
   a transfer rule instance, configured to monitor particular parameters comprised by particular management rules on the server and/or the gateway; and
   a topology management instance comprising information regarding potential target systems for transfer of the at least one application.

14. The control system according to claim 13, wherein the transfer rule instance is further configured to make a decision regarding transferring the at least one application to being activated at a further gateway in accordance with the at least one transfer rule.

* * * * *